2,189,680

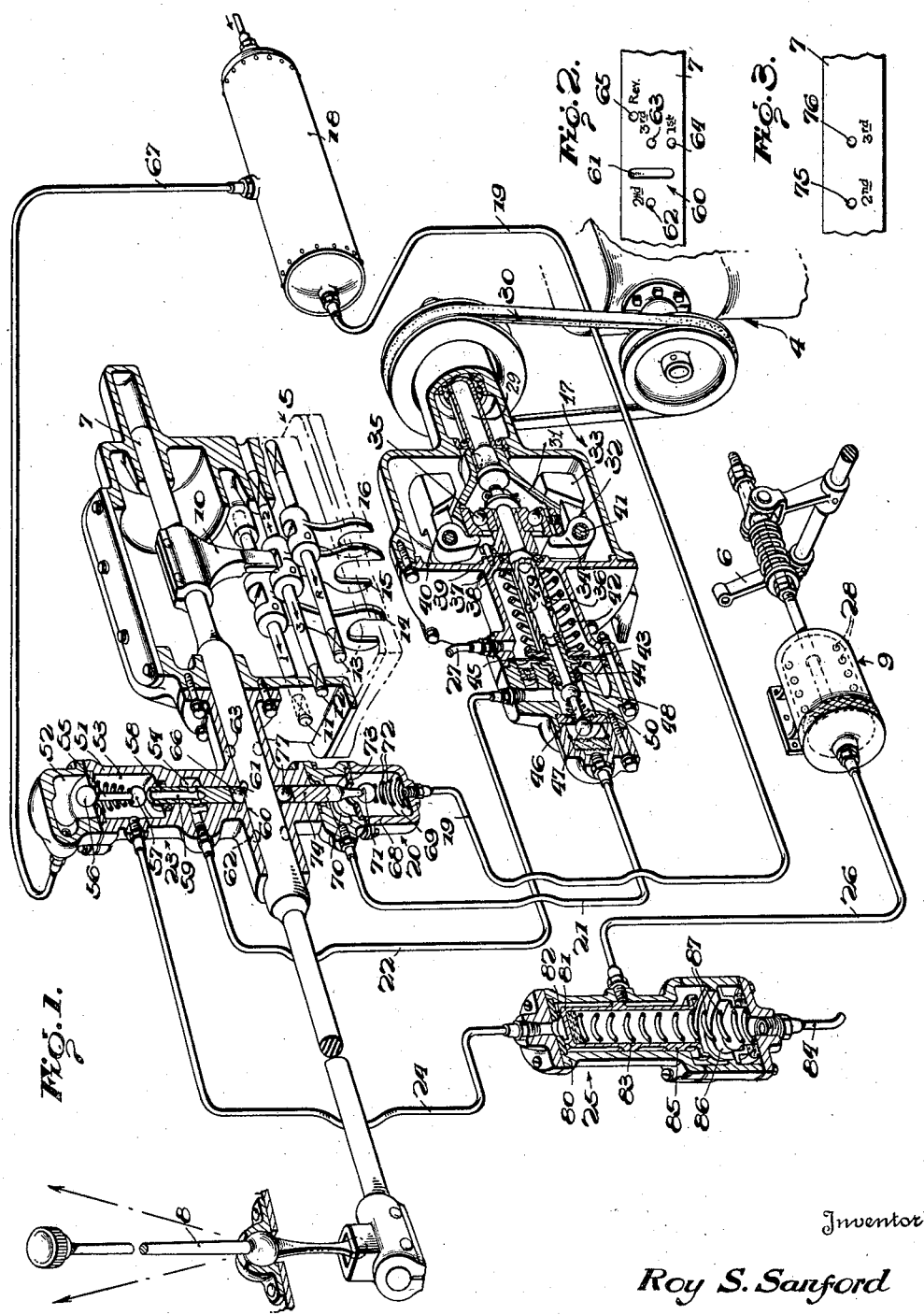
Feb. 6, 1940. R. S. SANFORD 2,189,680
GEAR SHIFTING MECHANISM
Filed Oct. 28, 1937
Inventor
Roy S. Sanford
By N. D. Parker jr.
Attorney Patented Feb. 6, 1940

UNITED STATES PATENT OFFICE 2,189,680

GEAR SHIFTING MECHANISM

Roy S. Sanford, Pittsburgh, Pa., assignor to Bendix-Westinghouse Automotive Air Brake Company, Pittsburgh, Pa., a corporation of Delaware Application October 28, 1937, Serial No. 171,568

16 Claims. (Cl. 192—3.5)

This invention relates to motor vehicle control mechanisms and more particularly to a mechanism enabling coordinated control of the vehicle transmission and clutch with a minimum number of operations on the part of the operator.

One of the objects of the present invention is to provide a vehicle-controlling mechanism constituted in such a manner that the controls for varying the transmission gear relations and for effecting disengagement and engagement of the vehicle clutch are materially simplified.

Another object is to provide, in a manually-operable gear-shifting mechanism for vehicles, a novel arrangement for automatically controlling the disengaging and engaging movements of the vehicle clutch during changes in the gear relations.

Still another object is to provide, in a motor vehicle, a novel and simplified arrangement of transmission and clutch control, wherein the clutch may be engaged in accordance with variations in motor speed and in timed relation with respect to transmission changes.

A further object is to associate a manually-operable transmission shifting member with a centrifugally-operable clutch control mechanism in such a manner that engagement of the clutch, when the transmission is established in certain of the forward gear relations, will be assured, irrespective of motor speed.

Other objects and novel features of the invention will appear more fully hereinafter from the following detailed description when taken in connection with the accompanying drawing illustrating one embodiment of the invention. It is to be expressly understood, however, that the drawing is employed for purposes of illustration only and is not designed as a definition of the limits of the invention, reference being had for this purpose to the appended claims.

Referring to the drawing, wherein similar reference characters refer to similar parts throughout the several views:

Fig. 1 is a diagrammatic view, partly in section, of an automotive vehicle control mechanism constructed in accordance with the principles of the present invention;

Fig. 2 is a partial developed plan view of one portion of the gear-shifting rod, and Fig. 3 is a partial developed plan view of another portion of the gear-shifting rod.

Referring more particularly to Fig. 1, the present invention is illustrated therein in connection with an automotive vehicle having an engine 4, a ratio-changing transmission 5 and a clutch-controlling member 6. The transmission 5 is so constituted that the various changes in gear ratio are effected through the oscillating and shifting movements of a rod 7, the operation of the latter being under the direct supervision of the operator through a manually-controlled remotely-positioned lever 8. The clutch-controlling member 6 is adapted to be operated by a fluid motor 9, the construction of the latter and the association thereof with the gear-shifting mechanism being such that, during operation of said mechanism, the clutch-controlling member 6 will be automatically controlled to the end that the automotive vehicle clutch may be efficiently engaged and disengaged in proper sequence with relation to the changes in the transmission gear ratio.

In order that the movements of the gear-shifting member 8 may be utilized to select and shift the usual elements of the transmission 5, the member 7 is provided with a combined selector and shifter member 10 which selects one of the shift rails 11, 12 or 13, the latter carrying shifter forks 14, 15 and 16 which are associated with the gears to be shifted. The shift rails 11 and 13, when moved to the left, as viewed in Fig. 1, respectively establish first and reverse gear ratios, while corresponding movement of the shift rail 12 effects third gear ratio and opposite movement thereof serves to establish the second gear relation.

Means are provided for controlling the clutch-engaging and disengaging movements of clutch-controlling member 6 during changes in the transmission ratio, and preferably such means are so constructed that the clutch is disengaged when the engine 4 is idling and is permitted to engage when the speed of the engine is gradually increased. As shown, such means include a centrifugally-controlled valvular mechanism 17 which is preferably constructed in accordance with the application of Roy S. Sanford, Serial No. 171,570, filed October 28, 1937, for Vehicle control mechanism. With the engine 4 idling, the valvular mechanism 17 serves to conduct fluid pressure from a reservoir 18 to the clutch motor 9 by way of conduit 19, valve 20, conduit 21, valvular mechanism 17, conduit 22, valvular mechanism 23, conduit 24, valvular mechanism 25 and conduit 26. When the speed of the engine is increased above idling speed, valvular mechanism 17 operates in such a manner as to exhaust the fluid from the clutch motor 9 through conduit 26, valvular mechanism 25, conduit 24, valvular mechanism 23, conduit 22 and exhaust conduit 27, the construction being such that the fluid pressure is gradually exhausted in accordance with increased engine speed, thus permitting the vehicle clutch to be smoothly engaged through the action of the usual clutch return springs associated therewith, such engaging action being aided by a return spring 28 associated with the clutch motor 9.

The centrifugally-operated valve mechanism 17 more particularly includes a shaft 29 drivably connected at one end with the engine through a belt and pulley drive 30, the other end of the shaft having a rotor 31 secured thereto and provided with a plurality of centrifugally-actuated levers 32. The latter include a weighted arm 33 and an actuating arm 34, and the construction is such that the arm 34 is adapted to cooperate with a bearing 35 which is capable of a limited sliding movement with respect to the rotor. The bearing 35 is adapted to pilot at one end a valve-actuating member 36, and the latter is maintained in a non-rotatable condition as by means of an extension 37 provided on a collar 38, said extension embracing a stud 39 carried by a casing 40 of the valvular mechanism 17. From this arrangement, it will be readily perceived that, as the speed of the rotor 31 increases, centrifugal force will effect a movement of levers 32 about pivot pins 41 in order to cause arms 34 to move bearing 35 and valve-actuating member 36 to the right, as viewed in Fig. 1. The latter member is normally urged toward the left, as viewed in this figure, through a spring 42, confined between a portion of the casing 40 and a diaphragm 43 suitably secured to member 36 as by means of elements 44 and 45.

The valvular mechanism 17, in addition to the centrifugally-operated actuating device heretofore described, includes also a valve structure comprising a valve 46 provided with intake and exhaust heads 47 and 48 respectively, the intake head, when open, serving to connect conduits 21 and 22 and the exhaust valve head 48, when open, serving to connect conduits 22 and 27. This latter connnection includes a plurality of ports 49 positioned in the member 36 and also includes the member 44 which is hollow and is adapted to form at its left-hand extremity a seat for the exhaust valve head 48. The valve 46 has associated therewith a spring 50 which constantly tends to seat the intake valve head 47.

Preferably, the parts of the centrifugally-operated valvular mechanism 17 are so initially adjusted that, with the engine idling, the spring 42 serves to move actuating member 36 to the left in order to effect contact between member 44 and exhaust valve head 48 and lift the intake valve head 47 off its seat. Under these conditions, fluid pressure will be conducted from conduit 21 to conduit 22 and, as heretofore described, the clutch motor 9 will be energized in order to effect disengagement of the vehicle clutch. When engagement of the clutch is desired, the engine speed is increased by manipulation of the usual accelerator pedal and the valve-actuating member 36 will be moved to the right, as viewed in Fig. 1, through the action of the centrifugally-operable weighted levers 32. Thus the intake valve head 47 will be closed through the action of spring 50 and member 44 will be moved away from the exhaust valve head 48 in order to gradually connect conduit 22 with the atmospheric exhaust conduit 27 through member 44 and port 49. Thus the vehicle clutch may be smoothly engaged by increasing the engine speed.

The invention as disclosed in Fig. 1, in addition to embodying the construction heretofore described, which secures the highly desirable advantageous results outlined, moreover is constituted in such a manner that, when the gear-shifting mechanism is operated to effect gear changes, the vehicle clutch will be automatically disengaged regardless of the centrifugally-operated valvular mechanism. To this end, the valvular mechanism 23 is provided, the said mechanism being associated with the shifting rod 7. As shown, such mechanism includes a casing 51 provided with inlet, outlet and exhaust chambers 52, 53, and 54 respectively, a valve 55 being housed within the casing and having an intake head 56 positioned within chamber 52 and an exhaust head 57 located within chamber 53. A valve-actuating member 58 is slidably mounted within the casing 51 and its upper portion is provided with a bore 59 functioning as an exhaust valve seat for head 57 and also serving to connect chamber 53 with conduit 22 when the member 58 is moved out of contact with respect to head 57. The valve-actuating member 58 is operated by a suitable cam mechanism 60 associated with the shifting rod 7, such mechanism being so formed as to provide a centrally-disposed cam slot 61 and a pair of indentations 62 and 63 disposed on opposite sides of the cam slot 61. As will appear more particularly from Fig. 2, wherein the top portion of shifting rod 7 is disclosed in developed plan view, the cam mechanism 60 also includes cam indentations 64 and 65. The cam slot 61 and cam indentations heretofore referred to are adapted to cooperate with a cam ball 66 in constant engagement with the lower end portion of valve-operating member 58. With such an arrangement, and with the transmission in the neutral position illustrated in Fig. 1, the cam ball 66 will be received within cam slot 61 and thus exhaust valve head 57 will be opened and conduits 24 and 22 will be connected through chamber 53, bore 59 and chamber 54. Thus fluid pressure will be conducted from the valvular mechanism 17 to the clutch motor 9 and the vehicle clutch will be disengaged with the transmission in neutral and the engine idling. Under such conditions, movement of the gear-shifting rod 7 in either direction from neutral position will serve to move member 58 upwardly, as viewed in Fig. 1, by reason of the cam ball 66 being cammed out of slot 61. This operation serves to close exhaust valve 57 and open intake valve 56, the operation of these valves being effected prior to actual engagement of the desired gear ratio by reason of the usual amount of lost motion provided in the transmission. When intake valve 56 is open, fluid pressure is conducted from the reservoir 18 to the clutch motor 9 by way of conduit 67, valve 23, conduit 24, valve 25 and conduit 26. After completion of the gear-shifting movement of the rod 7, the cam indentations 62 or 63 will be in contact with the cam ball 66 and the valvular mechanism 23 will be returned to the position shown on Fig. 1 where the centrifugally-controlled valve mechanism 17 controls the application of fluid pressure to the clutch motor 9. Thus the valve mechanism 23 insures disengagement of the vehicle clutch prior to establishment of any gear relation irrespective of the centrifugally-controlled valve mechanism 17 and hence disengagement of the clutch during changes in transmission ratio are effected regardless of the speed of the engine.

In order to prevent the centrifugally-controlled valve mechanism 17 from supplying fluid pressure to the clutch motor when the vehicle transmission is shifted to certain forward speed gear ratios, means are provided for disconnecting such valve mechanism from the source of fluid pressure whenever a shift to a forward gear ratio other than first speed is desired. As shown, such means include the valvular mechanism 20 which comprises a casing 68 defining intake and outlet chambers 69 and 70 respectively. A valve 71 positioned within the intake chamber 69 has associated therewith a spring 72 which normally urges the valve toward a seat 73 which, when engaged, cuts off communication between chambers 69 and 70. Valve-actuating element 74 slidably mounted within casing 68 functions, under conditions which will appear more fully hereinafter, to move the valve 71 off its seat and establish communication between chambers 69 and 70. It will be understood that, when valve 71 is closed, communication between reservoir 18 and conduit 21 leading to the centrifugal valve mechanism 17 is cut off, and, under such conditions, the valve 17 will not supply the clutch motor 9 with fluid pressure.

In order to control the operation of the valve 71 in the manner heretofore stated, the underneath portion of rod 7, as viewed in Figs. 1 and 3, is provided with a pair of cam indentations 75 and 76 which are adapted to receive a cam ball 77 which is normally in constant engagement with the valve-operating member 74. The construction is such that, when the cam ball 77 is not in registry with either of the cam indentations 75 or 76, the valve 71 will be opened and fluid pressure will be conducted to the centrifugal valve 17. However, the flow of fluid pressure to the centrifugal valve will be cut off whenever the cam ball 77 is received within cam indentations 75 or 76, the spring 72 associated with valve 71 under these circumstances moving the said valve to seat 73. As shown in Fig. 3, the cam indentations 75 and 76 only register with the cam ball 77 when the gear-shifting rod 7 is placed in second or third gear relation. In all other positions, the valve 71 conducts fluid pressure to the centrifugal valve 17.

From the above construction, it will be understood that, when the gear-shift mechanism functions to establish second or third gear ratio, the centrifugally-operable valve mechanism will be rendered inoperative to supply fluid pressure to the clutch motor 9. Thus, with the transmission in second or third gear ratio, there will be no danger of disengagement of the clutch should the engine speed decrease to that value which would place valvular mechanism 17 in a position to charge conduit 22 with fluid pressure. While the centrifugally-operated valve mechanism 17 is rendered inoperative in the manner above specified, it will be understood that the operation of the valve 23 during shifting movement of the shifting rod 7 in effecting gear changes efficiently controls the flow of fluid pressure to the clutch motor in order to cause clutch-disengaging movement of the latter.

While the valve 23 heretofore described controls the clutch-disengaging movement of the clutch motor 9 under certain conditions, it will be readily perceived that the association of valves 23 and 17 is such that the latter serves to control the exhaust of fluid pressure from the motor 9 and thus the engagement of the vehicle clutch, irrespective of the gear ratio established by the transmission mechanism. This will be readily understood when it is considered that conduit 22 connected with the centrifugally-controlled valve is always connected with conduit 24 associated with the clutch motor, whenever the valve 23 is in the position shown in Fig. 1 or in the position where the cam ball 66 engages any of the cam indentations 62, 63, 64 or 65. One of such last named cam indentations will be engaged when any gear ratio of the transmission is established. Thus, although when second or third relation is established, the valve 23 serves to control the disengagement of the vehicle clutch, still, after establishment of the second or third gear relation, the exhaust of fluid from the clutch motor will be controlled by the centrifugally-operable valve mechanism. Hence the latter efficiently controls engagement of the clutch irrespective of the established gear ratio.

The flow of fluid pressure through conduit 24 to the clutch motor 9 is preferably controlled by the valvular mechanism 25 constructed in accordance with the application of Roy S. Sanford and William J. Andres, Serial No. 68,324, Vehicle control mechanism, filed March 11, 1936 now matured into Patent No. 2,128,165, dated August 23, 1938. Such valve mechanism is constituted in such a manner that a substantially high pressure is required to open the valve in order to connect conduits 24 and 26 for charging the clutch motor 9. Preferably, this pressure is sufficiently high to effect both disengaging and engaging movement of the clutch member 6. On the other hand, valve device 25 will remain open in order to permit exhausting of fluid pressure from the clutch motor 9 until such pressure is at a materially lower value than that required to open the valve. Thus the exhaust of the fluid pressure may be controlled through operation of the centrifugally-operated valve mechanism 17 in the manner heretofore described.

More particularly, the valve 25 includes a casing 80 housing a valve member 81, the latter being provided at its upper end portion with a skirt 82 of lesser diameter than the diameter of the valve member 81. The latter is provided with a cylindrical body portion 83 serving as a valve element and located in such a position with respect to conduit 26 that, with the parts in the position shown, the said conduit communicates with exhaust passage 84. Such communication is enabled past a plurality of guides spaced about member 81, one of which is shown at 85, and into chamber 86 which is in constant communication with the exhaust passage 84. A spring 87 normally urges valve member 81 upwardly in order to maintain the latter in such position that the conduit 26 is exhausted to atmosphere and skirt 82 is maintained against the top of casing 80. The tension of such spring is also so regulated that, with the application of fluid pressure through conduit 24 to the head of member 81, the latter will be maintained closed until sufficient pressure is built up on that portion of the head defined by skirt 82 to overcome the spring tension. As soon as the pressure built up slightly exceeds the pressure of the spring 87, the valve element 81 will be snapped downwardly and maintained in such position due to the fact that the area of the head 82 then presented to the fluid pressure from conduit 24 will exceed the cross-sectional area of the head initially presented to such pressure. Under these conditions, fluid pressure from valve 81 will be conducted around the space between said valve and the casing 80 to conduit 26 and thence to the clutch motor. The resultant energization of the clutch motor will effect clutch-disengaging movement of the clutch member 6. On the other hand, increase in the speed of the engine will so operate valve mechanism 17 as to gradually connect conduit 22 with the exhaust conduit 27. Fluid pressure from the clutch motor will thereupon be conducted through conduit 26 to the valve 25, and, since the entire area of valve element 81 is subjected to the pressure of the fluid from conduit 26, the said valve element will remain open and permit fluid pressure to be conducted to conduit 24. It will be also understood that the fluid pressure in conduit 26 will fall considerably below that value which was necessary to initially open the valve device 81, before the same closes. When the pressure of the fluid drops to such an extent that the spring 87 closes the valve 81, the pressure of the fluid remaining in the clutch motor 9 will be substantially low and the clutch will be effectively engaged. Any remaining fluid pressure will be conducted past the guides 85 on valve 81 to chamber 86 and thence to the atmosphere through connection 84.

In operation, with the engine 4 idling, and the gear-shifting rod 7 in the neutral position illustrated, fluid pressure will be conducted from reservoir 18 to the clutch motor 9 by way of conduit 19, valve 20, conduit 21, centrifugal valve mechanism 17, conduit 22, valve 23, conduit 24, valve 25 and conduit 26. With the clutch thus disengaged in neutral, the control element 8 may be moved to first gear relation and, during this movement, the rod 7 is oscillated in order to effect a movement of selector 10 into engagement with shifter fork 14 carried by the shift rod 11. The control element 8 may then be moved rearwardly, as indicated in Fig. 1, in order to move the selected shift rod to the left to establish first gear relation. Although, during the establishment of first gear ratio, the clutch motor 9 is momentarily connected with reservoir 18 through valve 23 opened by reason of the cam ball 66 being moved out of cam slot 61, still this action will have no effect on the clutch motor except to assure disengagement of the vehicle clutch during actual establishment of the first gear relation. As soon as this relation is established, the cam ball 66 of valve 23 enters cam indentation 64 and communication between the clutch motor and the reservoir 18 by way of valve 23 will be interrupted. However, fluid pressure will be continued to be supplied to the clutch motor by way of valve 20 and engagement of the clutch will only be effected through an increase in speed of the engine 4 which will operate the centrifugally-controlled valve mechanism 17 in the manner heretofore described to connect conduit 22 with exhaust conduit 27.

In establishing reverse gear ratio, the control element 8 is oscillated in the opposite direction from the manner in which the same is oscillated to establish first gear relation, and selector member 10 will engage shifter fork 16 associated with the shift rail 13. This rail will be moved to the left, as viewed in Fig. 1, when control element 8 is moved to the right and precisely the same operation of valve 23 will occur during establishment of the reverse gear relation as occurred during the change to first gear ratio.

However, in the event that the control element 8 is moved to the left or right from the position shown in Fig. 1, in order to respectively establish second or third gear relation, in addition to the operation of valve 23 which takes place in the same manner as in effecting first or reverse gear relation, the valve 20 will be moved to such a position as to disconnect the centrifugal valve mechanism 17 from the reservoir 18 as soon as the second or third gear relation has been completed. This is due to the fact that the cam ball 77 associated with valve 20 will enter one of the cam indentations 75 or 76. Thus, with the transmission shifted to second or third gear ratio, the centrifugally-controlled valve 17 will be rendered inoperative to effect disengaging movement of the vehicle clutch. However, in effecting engagement of the vehicle clutch after the establishment of any gear ratio, the exhausting of fluid pressure from the clutch motor 9 will be controlled by the operation of centrifugally-operable valve mechanism 17 in a manner heretofore described in detail.

There has thus been provided by the present invention a novel vehicle-controlling mechanism wherein a manually-controlled transmission has been associated with an automatically-controlled valve in such a manner that disengaging and engaging movements of the vehicle clutch are properly coordinated with changes in the transmission ratios, and the construction is such that, when the manually-controlled transmission is established in second or third gear relation, the centrifugally-controlled valve controlling the operation of the vehicle clutch will be rendered inoperative to effect disengagement of the clutch under any conditions of engine speed.

While one embodiment of the invention has been illustrated and described herein with considerable particularity, it is to be understood that the invention is not limited thereto but may be embodied in other forms as well understood by those skilled in the art. Reference will, therefore, be had to the appended claims for a definition of the limits of the invention.

What is claimed is:

1. In combination with an automotive vehicle engine, a gear-changing mechanism including a manually-operable element movable to select and to establish different gear ratios, a clutch-controlling member, means including a fluid motor for controlling the clutch-disengaging and engaging movements of said last named member, valve means operable by said mechanism for controlling the energization of said motor, other valve means controlled by the speed of said engine for effecting energization of said motor, and means for rendering the last named valve means inoperative to energize the fluid motor, irrespective of engine speed, when the said mechanism is operated to establish and maintain a predetermined gear ratio, said last named means including a valve operated by movement of said element.

2. In combination with an automotive vehicle engine, a gear-changing mechanism including an oscillatable and shiftable element, a clutch-actuating member, means including a fluid motor for controlling the movements of said member, means for varying the fluid pressure in said motor in order to effect and control the clutch-disengaging and engaging movements of said member, said means including a pair of valves, one operated by said mechanism, and the other controlled by the speed of the engine, means including a valve operated by said element for connecting said speed-controlled valve with a pressure source, and means for interconnecting said valves in such manner that the fluid pressure in said motor is exhausted from the speed-responsive valve through the mechanism-operated valve to control the clutch-engaging movement of said member and irrespective of the gear ratio established by said mechanism.

3. In combination with an automotive vehicle engine, a gear-changing mechanism including an oscillatable and shiftable element, a clutch-actuating member, means including a fluid motor for controlling the movements of said member, means for varying the fluid pressure in said motor in order to effect and control the clutch-disengaging and engaging movements of said member, said means including a pair of valves, means associated with the engine for operating one of the valves in accordance with variations in engine speed, means including a valve device operated by said element for connecting said speed-operated valve with a pressure source, means controlled by said mechanism for operating the other of said valves to supply fluid pressure to said motor independently of said one valve, and means for interconnecting said valves in such manner that the fluid pressure from said motor will be exhausted through said one valve by way of said other valve.

4. In combination with an automotive vehicle engine, a gear-changing mechanism including an oscillatable and shiftable element, a clutch-actuating member, means including a fluid motor for controlling the movements of said member, means including a centrifugally-controlled valve means for supplying fluid pressure to said motor when the mechanism is in one predetermined gear-engaged position, and means operable irrespective of engine speed for rendering said centrifugally-controlled valve means inoperative to supply fluid pressure to the motor when the mechanism is in another predetermined gear-engaged position, said last named means including a valve device operated by said element.

5. In combination with an automotive vehicle engine, a gear-changing mechanism including an oscillatable and shiftable element, a clutch-actuating member, means including a fluid motor for controlling the movements of said member, means including a centrifugally-controlled valve means for connecting said motor with a source of fluid pressure when the mechanism is in one predetermined position, and means operable when the mechanism is in another predetermined position for disconnecting the centrifugally-controlled valve means from the source, said last named means including a valve device operated by said element.

6. In combination with an automotive vehicle engine, a gear-changing mechanism including an oscillatable and shiftable element, a clutch-actuating member, means including a fluid motor for controlling the movements of said member, means including a centrifugally-controlled valve means for connecting said motor with a source of fluid pressure when the mechanism is in one predetermined position, and means directly operated by said element for rendering said centrifugally-controlled valve means inoperative to connect the motor with said source of fluid pressure when the mechanism is in a predetermined gear-engaged position.

7. In combination with an automotive vehicle engine, a gear-changing mechanism including an oscillatable and shiftable element, a clutch-actuating member, means including a fluid motor for controlling the movements of said member, means including a centrifugally-controlled valve means for controlling the flow of fluid pressure to and from the motor, valve means actuated by the mechanism for controlling the flow of fluid pressure to and from the motor, and means directly operated by said element for rendering the centrifugally-controlled valve means inoperative to control the flow of fluid pressure to the motor when the element is moved to a predetermined position.

8. In combination with an automotive vehicle engine, a gear-changing mechanism including an oscillatable and shiftable element, a clutch-actuating member, means including a fluid motor for controlling the movements of said member, means including a centrifugally-controlled valve means for connecting said motor with a source of fluid pressure, valve means actuated by said mechanism for connecting the motor with the source, and means actuated by the movement of the element to a predetermined position for disconnecting the centrifugally-controlled valve means from said source.

9. In combination with an automotive vehicle engine, a gear-changing mechanism including an oscillatable and shiftable element, a clutch-actuating member, means including a fluid motor for controlling the movements of said member, means including a centrifugally-controlled valve means for connecting said motor with a source of fluid pressure, valve means actuated by said mechanism for connecting the motor with the source, and a valve device actuated by the element during movement thereof to a predetermined position for disconnecting the centrifugally-controlled valve means from said source.

10. In combination with an automotive vehicle engine, a gear-changing mechanism including an oscillatable and shiftable element, a clutch-actuating member, means including a fluid motor for controlling the movements of said member, valve means operable during operation of said mechanism in effecting all changes of gear to supply fluid pressure to said motor to cause clutch-disengaging movement of said member, other valve means responsive to the speed of the engine for supplying fluid pressure to the motor, and means operable during predetermined changes of gear for rendering the last named valve means inoperative to supply fluid pressure to the motor, said last named means including a valve device operated by said element and maintaining said last named valve means inoperative after completion of said predetermined gear changes.

11. In combination with an automotive vehicle engine, a gear-changing mechanism including an oscillatable and shiftable element, a clutch-actuating member, means including a fluid motor for controlling the movements of said member, means for varying the fluid pressure in said motor in order to effect and control the clutch-disengaging and engaging movements of said member, said means including a centrifugally-controlled valve means, a source of fluid under pressure, a valve device for connecting said source and valve means, and cam means operable when the mechanism is moved to a predetermined position for operating said valve device to interrupt communication between the source and valve means.

12. In combination with an automotive vehicle engine, a gear-changing mechanism including an oscillatable and shiftable element, a clutch-actuating member, means including a fluid motor for controlling the movements of said member, means for varying the fluid pressure in said motor in order to effect and control the clutch-disengaging and engaging movements of said member, said means including a centrifugally-controlled valve means, a source of fluid under pressure, a valve device for connecting said source and valve means, other valve means controlled by movement of said mechanism in effecting all gear changes to connect said motor and source, and cam means operable when the mechanism is moved to a predetermined position for operating said valve device to interrupt communication between the source and centrifugally-controlled valve means.

13. In combination with an automotive vehicle engine, a gear-changing mechanism including a manually-operable element movable to selectively establish first, second, third or reverse gear ratios, a clutch-controlling member, means including a fluid motor for controlling the clutch-disengaging and engaging movements of said member, valve means operable in accordance with variations in the speed of said engine, means connecting said valve means and source, and means carried by said element for rendering said last named connecting means inoperative to connect the valve means and source when said element is moved to establish second or third gear ratios.

14. In an automotive vehicle having an engine, a clutch-controlling member, and a transmission of the type having a device movable to select and shiftable to establish a desired gear relation, a fluid motor for controlling disengaging and engaging movements of said clutch member, valve means responsive to the speed of the engine for controlling the flow of fluid to and from said motor, a lever for moving and shifting said device, other valve means operable by shifting movement of said device for controlling the flow of fluid to and from said motor, valve mechanism operated by the device during shifting movement thereof for controlling the communication between the speed-responsive valve means and a fluid pressure source, and means for connecting said two valve means whereby fluid from said motor is conducted to said first named valve means through said second named valve means.

15. In combination with an automotive vehicle engine, a gear-changing mechanism including an oscillatable and shiftable element, a clutch- actuating member, means including a fluid motor for controlling the movements of said member, means for varying the fluid pressure in said motor in order to effect and control the clutch-disengaging and engaging movements of said member, said means including a pair of valves, means for operating one of said valves in accordance with the speed of the engine, means for operating the other of said valves by shiftable movement of said element, a valve mechanism adapted to be connected with said one valve, a source of fluid pressure, means connecting said other valve and the source, means connecting said source and valve mechanism, and means movable with said element during shifting movement of the latter for controlling said valve mechanism.

16. In combination with an automotive vehicle engine, a gear-changing mechanism including a manually-operable element movable to selectively establish first, second, third or reverse gear ratios, a clutch-controlling member, means including a fluid motor for controlling the clutch-disengaging and engaging movements of said member, valve means operable in accordance with variations in the speed of said engine, means connecting said valve means with said motor, a source of fluid pressure, valve mechanism for connecting said valve means and source, and cam means carried by said element for controlling said valve mechanism to interrupt communication between the valve means and source when the element is moved to establish the second or third gear ratio.

ROY S. SANFORD.